(12) United States Patent
Hsieh et al.

(10) Patent No.: US 8,682,379 B2
(45) Date of Patent: Mar. 25, 2014

(54) METHODS AND SYSTEMS OF DYNAMIC WIRELESS TRANSMITTING POWER CONTROL

(75) Inventors: Tien-Yuan Hsieh, Taoyuan County (TW); Jing-Shyang Hwu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 429 days.

(21) Appl. No.: 13/090,736

(22) Filed: Apr. 20, 2011

(65) Prior Publication Data

US 2012/0129459 A1    May 24, 2012

(30) Foreign Application Priority Data

Nov. 19, 2010    (TW) ............................... 99139968 A

(51) Int. Cl.
*H04M 1/00* (2006.01)
(52) U.S. Cl.
USPC ............................................ 455/522; 455/99
(58) Field of Classification Search
USPC .................... 455/69, 522, 13.4, 569.2, 99
See application file for complete search history.

(56) References Cited

U.S. PATENT DOCUMENTS

| 7,345,620 | B2 | 3/2008 | Voigtlaender et al. |
| 2003/0203742 | A1 | 10/2003 | D'Souza et al. |
| 2008/0318547 | A1* | 12/2008 | Ballou et al. .................. 455/410 |
| 2009/0129323 | A1 | 5/2009 | Chen et al. |
| 2009/0140887 | A1* | 6/2009 | Breed et al. ................... 340/990 |

FOREIGN PATENT DOCUMENTS

| CN | 1540596 A | 10/2004 |
| CN | 101151860 A | 3/2008 |
| TW | 201020140 A1 | 6/2010 |
| WO | 2004092876 A2 | 10/2004 |

OTHER PUBLICATIONS

Marc T.M, "Vehicle-to-vehicle Communication:Fair Transmit power control for Safety-Cirtical Information", Sep. 30, 2009, vol. 58, IEEE Trans.on Vehicular Technology.
Torrent-Moreno, M., "Distributed Fair Transmit Power Adjustment for Vehicular Ad Hoc Networks", Jan. 1, 2006, p. 479-488, Sensor and Ad Hoc Communications and Networks(SECON).
Jae-Young Seol, "Mobility-Assisted QoS Topology Control in Wireless Mobile Ad Hoc Networks", Sep. 1, 2009, Vehicular Technology Conference Fall(VTC Fall).
Gurumohan, P.C., "Topology Control for MANETs", Jan. 1, 2004, p. 599-603, Wireless Commuications and Networking Conference (WCNC).
Yu, C., "Power-stepped Protocol:Enhancing Spatial Utilization in a Clustered Mobile Ad Hoc network", Jul. 31, 2004, vol. 22, p. 1322-1334, IEEE Joyurnal on Selected Areas in Communications.
Taiwan Patent Office, "Office Action", Nov. 21, 2013.
China Patent Office, "Office Action", Dec. 25, 2013.

* cited by examiner

*Primary Examiner* — Tu X Nguyen
(74) *Attorney, Agent, or Firm* — WPAT, PC; Justin King

(57) ABSTRACT

The present disclosure relates to a method and system of dynamic wireless transmitting power control for a vehicle. The system of wireless transmitting power control comprises: a receiving unit, a state unit, a storing unit, a caution unit, a transmitting power decision unit and a transmitting unit. Accordingly, the system of dynamic wireless transmitting power control periodically adjusts a transmitting power level according to the number of driving vehicles so as to adjust transmission radius, decrease transmission interferences and accidents among cars and increase efficiency of wireless frequency usage.

24 Claims, 7 Drawing Sheets

METHODS AND SYSTEMS OF DYNAMIC WIRELESS TRANSMITTING POWER CONTROL

TECHNICAL FIELD

The present disclosure relates to a method and system for wireless dynamic transmitting power control, and more particularly, to a method and system for wireless dynamic transmitting power control (TPC) using on a vehicle.

TECHNICAL BACKGROUND

Cooperative vehicular safety technology provides full vehicle driving safety service by using short-range wireless communication. Regarding to the cooperative vehicular safety technology, it requires every vehicle periodically broadcasts current state information itself, which includes vehicles location itself, driving direction, speed, driveway, model, signature, etc, for reminding drivers to avoid the view mismatch and dead space. Additionally, the cooperative vehicular safety technology also requires every vehicle immediately broadcast emergency events (for example, emergency brake, driveway change, turn, overtaking, etc.), for informing the affected neighboring vehicles to avoid the car crash and traffic accident.

General speaking, wireless transmitting power control is only used to operate transactions between the base station and the mobile devices or among the mobile devices. Firstly, the transmitting power may be enclosed in a packet, and then the base station sends a packet to the mobile device. Subsequently, the mobile device measures the received signal strength and calculates the signal strength path loss model at the mobile device according to the transmitting power and the received signal strength. Afterward, the mobile device returns the results about the signal strength path loss model to the base station. Similarly, the base station also performs the process as similar as the mobile device and calculates the signal strength path loss model at the base station and returns the results about the signal strength path loss model to the mobile device. Thereby, this interchange process is alternately performed for obtaining optimal transmitting power. With regard to the transmission of transaction among the mobile devices, the interchanged processes are similar as transmission of transaction between the base station and the mobile.

However, the cooperative vehicular safety technology requires each vehicle regularly broadcasts current state information itself to its neighboring vehicles. Thereby, the conventional transmitting power control can not apply in the cooperative vehicular safety technology. In addition, it must consider problems, such as the vehicle speeding, the network topology changing, and difficult traffic density (the number of flowing vehicles/lane) calculating. Moreover, the cooperative vehicular safety technology does not have the transaction concepts, and therefore it can not teach or warn devices how to properly use the transmitting power, and when a driver use the cooperative vehicular safety technology to inform other drivers, and the other drivers can not answer the driver by using the proper transmitting power. As a result, the cooperative vehicular safety technology only uses the largest transmitting power to send information, and the efficiency of wireless frequency usage in the space will be poor and the chance of the signal interferences and the packet collisions will be increased if the vehicle drives in the heavy traffic or crowded area including vehicles sending the information by using the largest transmitting power. Taking IEEE 802.11p/IEEE 1609 for an example, the largest effective range is approximately 500 meter. Therefore, in the metro area with four-lanes highway and the largest effective transmission radius is 500 meter, it almost approximately has two hundreds cars to rival the wireless channel when the heavy traffic or high-density vehicle flow, resulting in serious packet interferences and collisions are occurred.

TECHNICAL SUMMARY

In one embodiment, the present disclosure provides a system of dynamic wireless transmitting power control using on a vehicle, comprising: a receiving unit, for receiving current state information of other driving vehicles around the vehicle; a state unit, for obtaining current state information of the vehicle; a storing unit, coupled to the receiving unit and the state unit, for storing current state information of the vehicle and the other driving vehicles; a transmitting power decision unit, coupled to the storing unit and including a predetermined transmitting power level lookup table, a predetermined upper limit threshold and a predetermined lower limit threshold, wherein the transmitting power decision unit periodically adjusts transmitting power level of the vehicle for generating a reference transmitting power level lookup table, a reference lower limit threshold and a reference lower limit threshold when the vehicle drives for a period of time; and a transmitting unit, coupled to the state unit and the transmitting power decision unit, for transmitting the current state information of the vehicle to the other driving vehicles.

In one embodiment, the present disclosure provides a method of dynamic wireless transmitting power control using on a vehicle, comprising: obtaining current state information of the vehicle; deciding a transmitting power level according to a predetermined transmitting power level lookup table; obtaining current state information of other driving vehicles around the vehicle at least one unit cycle; calculating the number of the other driving vehicles; comparing with the number of the other driving vehicles, a predetermined upper limit threshold and a predetermined lower limit threshold for determining traffic density state around the vehicle; and transmitting current state information of the vehicle to the other driving vehicles.

In another one embodiment, the present disclosure provides a method of dynamic wireless transmitting power control using on a vehicle, comprising: receiving current state information of one of other driving vehicles around the vehicle; storing current state information of the one of the other driving vehicles around the vehicle; determining whether traffic accident occurs according to current state information of the vehicle and current state information of the one of the other driving vehicles; comparing with transmitting power level of the vehicle and transmitting power level of the one of the other driving vehicles for choosing a largest transmitting power level when traffic accident is determined to be occurred; and transmitting a caution note to a driver in the one of the other driving vehicles using the largest transmitting power level.

In other embodiment, the present disclosure provides a method of dynamic wireless transmitting power control using on a vehicle, comprising: receiving an instruction from a driver in the vehicle; searching out other driving vehicles affected by the instruction; comparing with transmitting power level of the vehicle and transmitting power level of the other driving vehicles for choosing a largest transmitting power level; and broadcasting a caution note to the other driving vehicles using the largest transmitting power level.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
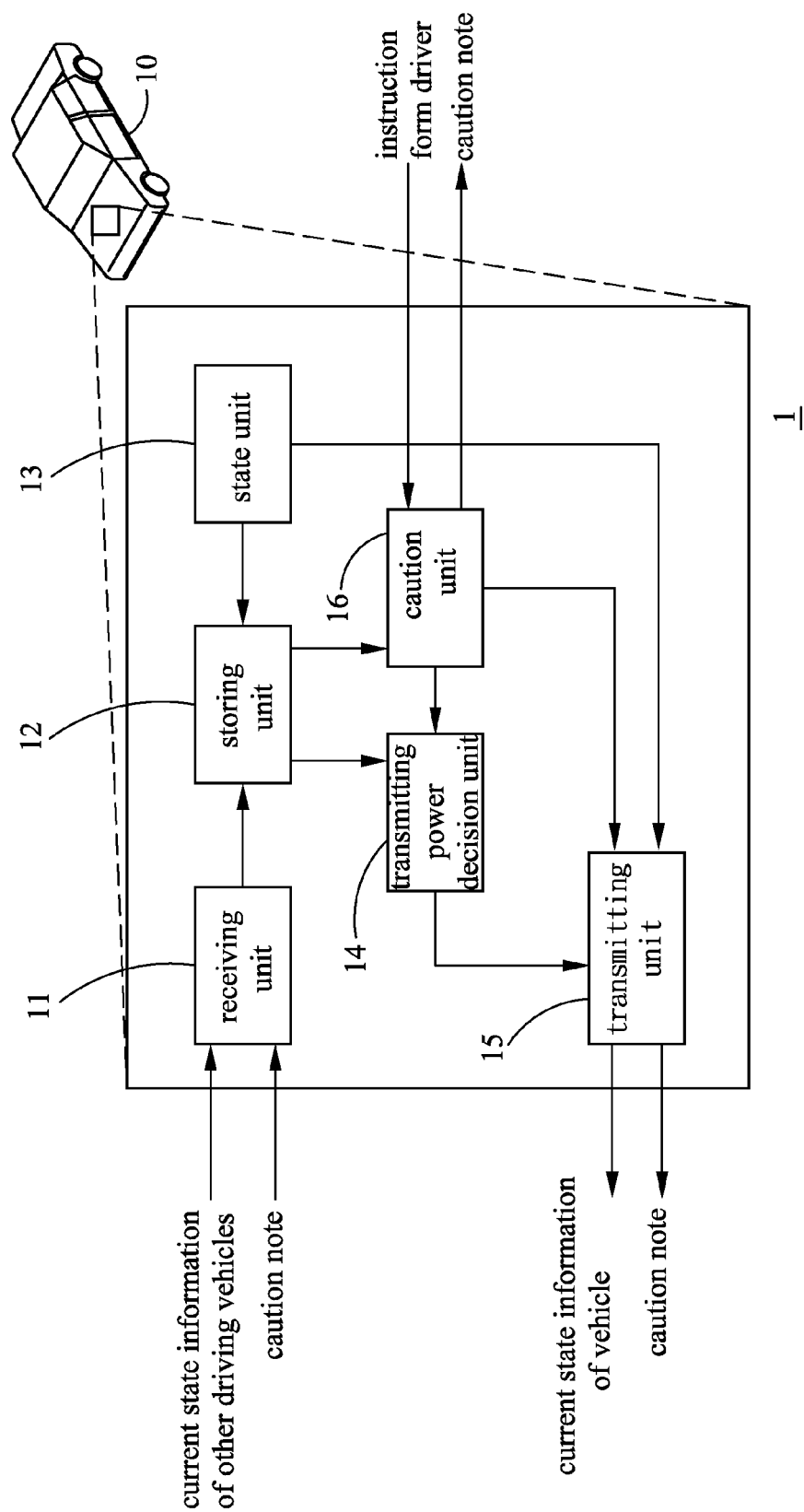
FIG. 1 is a schematic diagram showing a wireless dynamic transmitting power control system using on a vehicle according to one embodiment of the present disclosure.

FIG. 1 is a schematic diagram showing a wireless dynamic transmitting power control system 1 using on a vehicle according to one embodiment of the present disclosure. The system 1 comprises: a receiving unit 11, a storing unit 12, a state unit 13, a transmitting power decision unit 14 and a transmitting unit 15.

The receiving unit 11 is used for receiving current state information of other driving vehicles around a vehicle 10 by using a manner of wireless communication, and current state information of the other driving vehicles includes the other driving vehicles' speed, location, model, number, transmitting power level and signature, etc. The state unit 13 is used for receiving current state information of the vehicle 10 via a device (not shown in, for example, GPS-enabled device, OBD computer), wherein current state information of the vehicle includes the vehicle' location itself, speed, model, number and signature, etc. The storing unit 12 coupled to the receiving unit 11 and the state unit 13 is used for storing current state information of the vehicle 10 and the other driving vehicles, and the storing unit 12 is a storing device with Queue or limited space. In addition, the size of the storing unit 12 may be adjusted according to actual requirement or design.

The transmitting power decision unit 14 coupled to the storing unit 12 has a predetermined transmitting power level lookup table, a predetermined upper limit threshold, and a predetermined lower limit threshold. Specifically, during a period of time which the vehicle drives for, the transmitting power decision unit 14 periodically adjusts transmitting power level of the vehicle 10 according to the number of the other driving vehicles around the vehicle 10, the predetermined upper limit threshold and the predetermined lower limit threshold. In the embodiment, the system may automatically (or human manual) predetermine that speed 0-9 km/hr of the vehicle 10 belongs to transmitting power level 3, speed 10-19 km/hr belongs to transmitting power level 6, and so on. Therefore, every speed of the vehicle is associated with a transmitting power level, for example, Table 1 showing a predetermined dynamic transmitting power level lookup table according to the present disclosure. Classification method of the transmitting power level lookup table adopts liner function, polynomial, exponential function, logarithm function and the like, but it is not limited herein. Specifically, after the vehicle 10 just start, the vehicle 10 may obtains a transmitting power level according to the predetermined transmitting power level lookup table (for example, Table 1) corresponding to speed of the vehicle 10. Although the Table 1 is adopted in the present disclosure, the skilled person in the art should understand the predetermined transmitting power level lookup table, the predetermined upper limit threshold and the predetermined lower limit threshold may be changed according to actual requirement and design.

TABLE 1

| Speed | Transmitting Power Level |
|---|---|
| 0~9 km/hr | 3 |
| 10~19 km/hr | 6 |
| ... | ... |

Subsequently, during a period of time which the vehicle drives for, the transmitting power decision unit 14 calculates the number of the other driving vehicles around the vehicle 10 according to current state information of the other driving vehicles received at least one unit cycle (for example 10 seconds). Afterward, the transmitting power decision unit 14 further compares with the number of the other driving vehicles around the vehicle 10, the predetermined upper limit threshold and the predetermined lower limit threshold for determining the traffic density state around the vehicle, and then periodically minor adjusts the transmitting power level of the vehicle 10 to obtain a wireless transmission radius and generates or updates a reference transmitting power level lookup table, a reference upper limit threshold and a reference lower limit threshold. Based on the comparison among the number of the other driving vehicles around the vehicle 10, the predetermined upper limit threshold and the predetermined lower limit threshold in the present disclosure, it will be known that the vehicle 10 is determined in crowded state (for example heavy traffic) and the system may automatically (or human manual) decrease the transmitting power level of the vehicle 10 and the wireless transmission radius if the number of the other driving vehicles is larger than the predetermined upper limit threshold, and then the system may automatically (or human manual) generate and update the reference transmitting power level lookup table, the reference upper limit threshold and the reference lower limit threshold ; the vehicle 10 is determined in good flow quantity and maintain the transmitting power level and the wireless transmission unchanged if the number of the vehicle 10 is determined in between the upper limit threshold and the lower limit threshold; the vehicle 10 is determined in sparse state and the system may automatically (or human manual) increase the transmitting power level of the vehicle 10 and the wireless transmission radius if the number of the other driving vehicles is smaller than the predetermined lower limit threshold, and then the system may automatically (or human manual) generate and update the reference transmitting power level lookup table, the reference upper limit threshold and the reference lower limit threshold. Specifically, during a period of time which the vehicle drives for, the current transmitting power of the vehicle 10 will be periodically minor adjusted so as to continuously update the reference predetermined transmitting power level lookup table, the reference predetermined upper limit threshold and the reference predetermined lower limit threshold based on the comparison with the number of the other driving vehicles around the vehicle received in one or more unit cycles and the number of the other driving vehicles. The present disclosure periodically adjusts transmitting power level according to the number of the driving vehicles, and then adjusts the wireless transmission radius to decrease transmission signal collision and interference between the vehicles and increase efficiency of wireless frequency usage.

To sum up, when the vehicle 10 just starts, it does not collect current state information of the other driving vehicles, and can not adjust the transmitting power level according to the number of the driving vehicles. Thereby, the vehicle 10 must first check the predetermined lookup table to search out the transmitting power level corresponding to the present speed of the vehicle 10. After the vehicle 10 drives for a period of time, the vehicle 10 may collect current state information of the neighboring vehicles at least one unit cycle and calculates the number of the neighboring vehicles according to the received current state information so as to adjust the wireless transmission radius. The transmitting unit 15 coupled to the transmitting power decision unit 14 and the state unit 13 is used for transmitting current state information of the vehicle 10 to the other driving vehicles around the vehicle 10.

According to the wireless dynamic transmitting power control system 1 provided by the present disclosure, the system 1 further comprises a caution unit 16, which is coupled to the storing unit 12, receives an instruction from a driver in the vehicle and determines whether traffic accident occurs between the vehicles. Specifically, when the caution unit determines the traffic accident will be occurred, the caution unit sends a caution note to drivers in the vehicle 10 and the other driving vehicles. The caution note includes video, sound, picture and text, and the instruction is one of emergency brake, driveway change, turn and overtaking. In the embodiment, when one of the other driving vehicles will crash to the vehicle 10, the caution unit 16 notices that the distance between the one of the other driving vehicles and the vehicle is closer and the comparative speed between the one of the other driving vehicles and the vehicle is more fast via the storing unit 12, and therefore the caution unit 16 will generate the caution note to the driver in the vehicle 10 and transmits the caution note to drivers in the other driving vehicles via the transmitting unit 15. The transmitting power decision unit 14 will obtain the transmitting power levels of the vehicle 10 and the other driving vehicles from the storing unit 12, and comprises the transmitting power level of the vehicle 10 with the transmitting power level of the other driving vehicles for choosing a larger transmitting power level between the vehicle 10 and the other driving vehicles to transmit the caution note to the drivers in the vehicle and the other driving vehicles. The transmitting unit 15 is used for transferring the caution note to a driver in one of the other driving vehicles, and the receiving unit 11 is further used for receiving other caution notes from the other driving vehicles.

Similarly, when the vehicle 10 wants to change the driveway, perform the emergency brake, turn or overtaking, the caution unit 16 may receive the instruction form the driver and transfers a caution note to inform the other driving vehicles around the vehicle by the transmitting unit. Meanwhile, the transmitting power decision unit 14 obtains the transmitting power levels of the other driving vehicles around the vehicle form the storing unit 12, and then compares the transmitting power level of the vehicle 10 with the transmitting power level of the other driving vehicles for choosing the largest transmitting power level accordingly. Subsequently, a caution note is transferred to the drivers in the other driving vehicles for avoiding the traffic accident between the vehicle 10 and the other driving vehicles and accidents occurred.

Figure 2A:
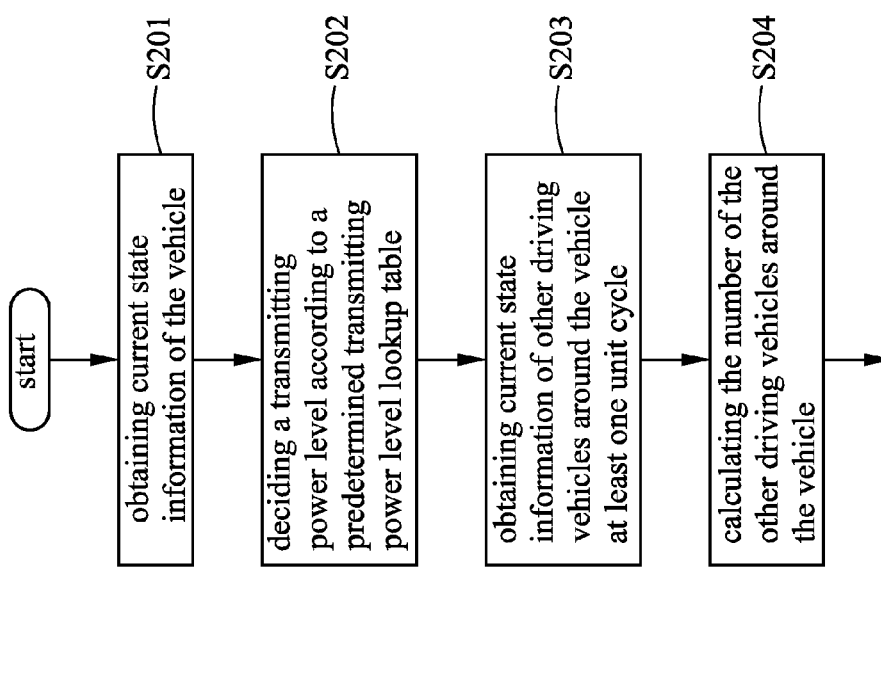
FIGS. 2A and 2B illustrate a flow chart showing a wireless dynamic transmitting power control method according to one embodiment of the present disclosure.
Figure 2B:
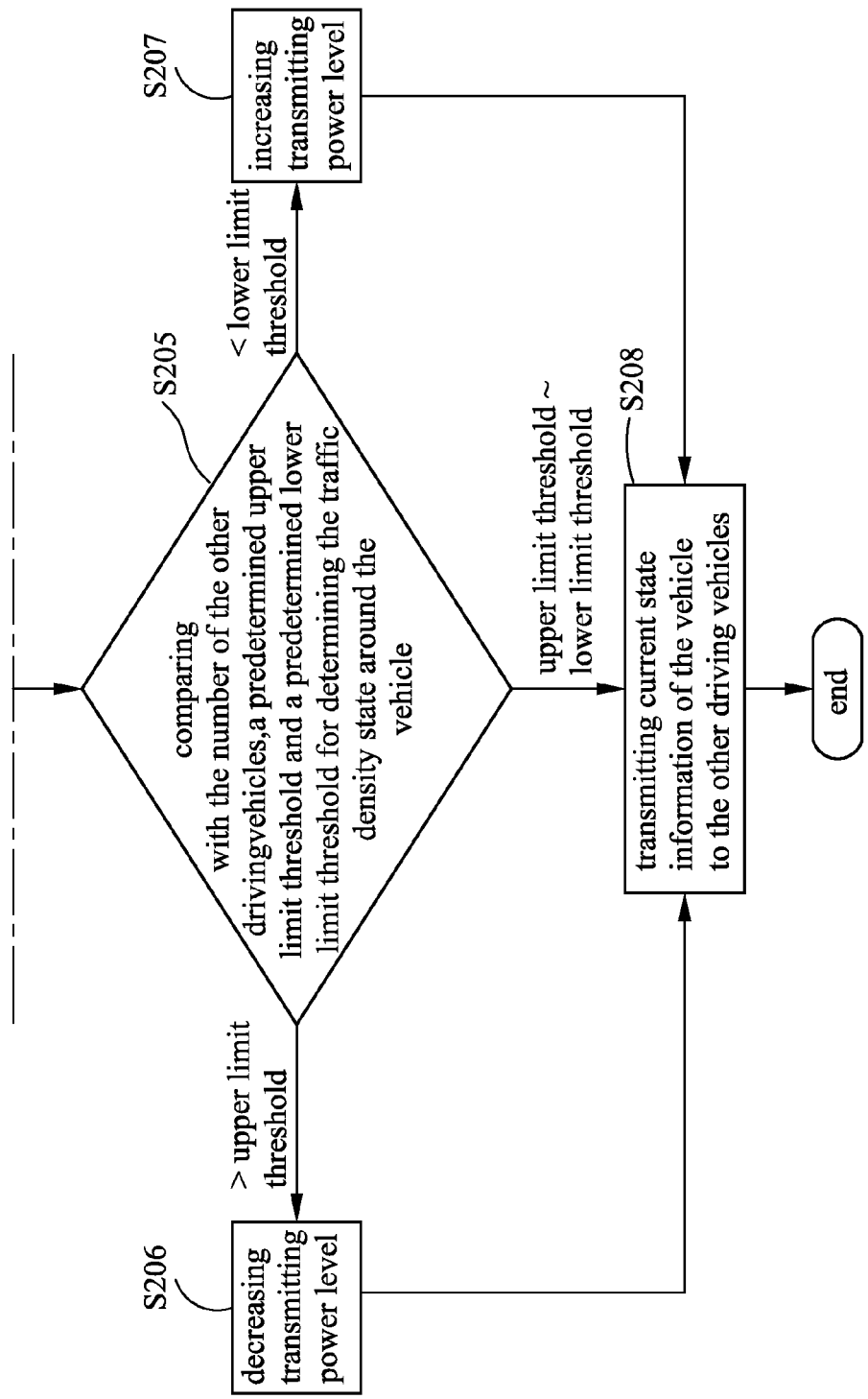

FIGS. 2A and 2B illustrate a flow chart showing a wireless dynamic transmitting power control method according to one embodiment of the present disclosure. In the embodiment, it needs to refer to the wireless dynamic transmission power control system in FIG. 1 to describe the steps of the dynamic transmission power adjustment method in the embodiment. Firstly, the transmitting power decision unit 14 obtains current state information including the vehicle location itself, speed, number and signature via the storing unit 12 (step s201). Subsequently, the transmitting power decision unit 14 searches a transmitting power level lookup table (for example Table 1) according to speed of the vehicle 10, and then checks a transmitting power level lookup table (for example Table 1) for obtaining a transmitting power level (step s202). Afterward, the receiving unit 11 receives the current state information of the other driving vehicles and the storing unit 12 stores the current state information. In accordance with the received current state information of the other driving vehicles in at least one cycle (step s203), the transmitting power decision unit 14 may calculate the number of the other driving vehicle around the vehicle 10 (step s204). The transmitting power decision unit 14 may compare with the number of the other driving vehicles around the vehicle 10, a predetermined upper limit threshold and a predetermined lower limit threshold for determining traffic density state around the vehicle 10, and then adjusts the dynamic transmitting power level (step s205). The vehicle 10 is determined in the crowded state and the system will decreases the transmitting power level (step s206) if the number of the other driving vehicles is larger than the predetermined upper limit threshold; the vehicle 10 is determined in the sparse state and the system increase the transmitting power level (step s207) if the number of the other driving vehicle is smaller than the predetermined lower limit threshold; the vehicle 10 is determined in good flow quantity and the system maintains the transmitting power level unchanged if the vehicle 10 is determined in between the predetermined upper limit threshold and the predetermined lower limit threshold. Lastly, the system transmits current state information of the vehicle 10 via the transmitting unit 15 (step s208).

Figure 3A:
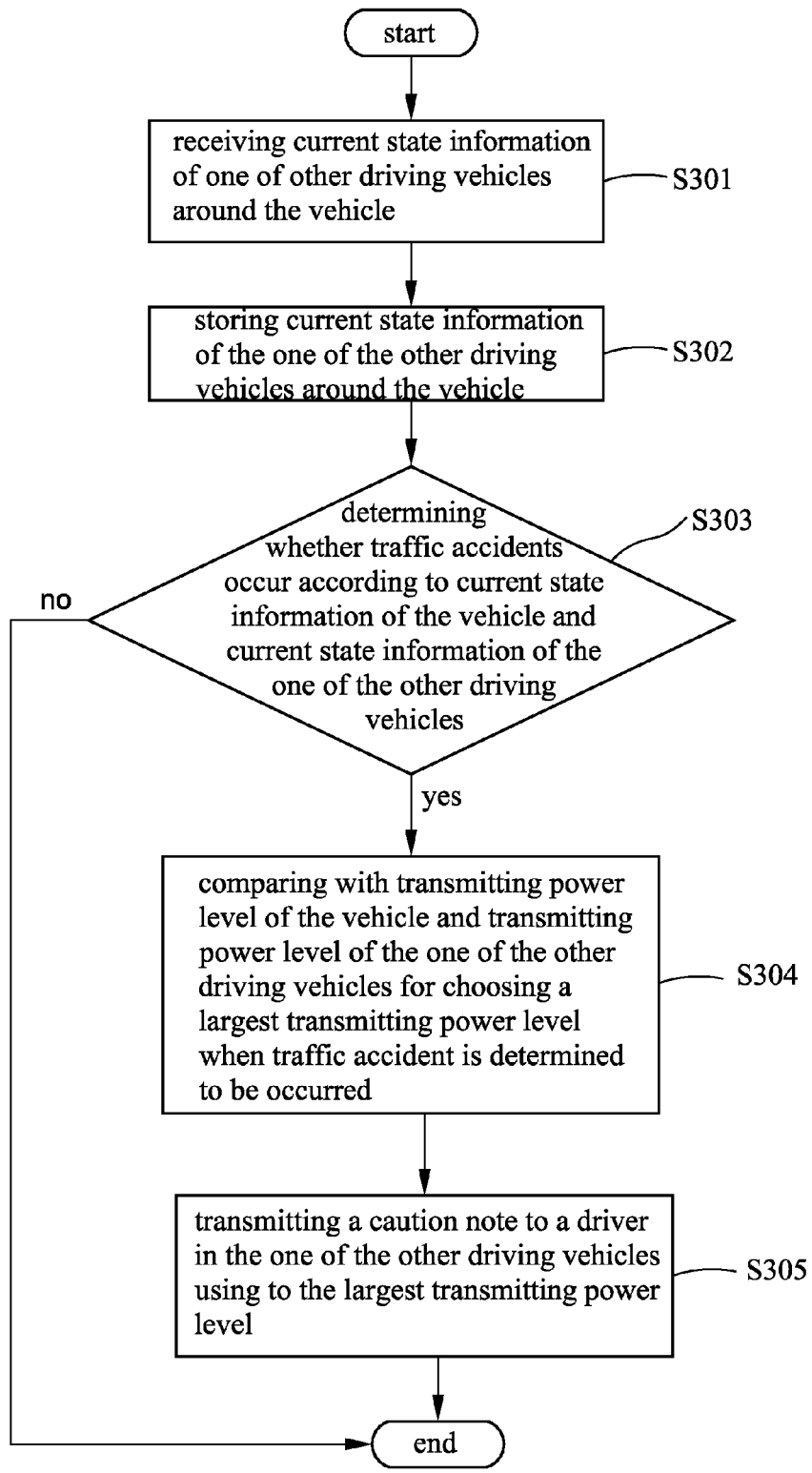
FIG. 3A illustrates a flow chart showing a wireless dynamic transmitting power control method according to another embodiment of the present disclosure.

FIG. 3A illustrates a flow chart showing a wireless dynamic transmitting power control method according to another embodiment of the present disclosure. In the embodiment, it needs to refer to the wireless dynamic transmission power control system in FIG. 1 to describe the steps of the dynamic transmission power adjustment method in the embodiment. Firstly, the receiving unit 11 receives current state information of one of the other driving vehicles (step s301), and the storing unit 12 stores current state information of one of the other driving vehicles (step s302). Subsequently, the caution unit 16 determines whether traffic accident occurs according to current state information of the one of the other driving vehicles, and cautions the drivers in the vehicle 10 and the one of the other driving vehicles (step s303). If the traffic accident will be occurred, the system compares the transmitting power level of the vehicle 10 with the transmitting power level of the one of the other driving vehicles for choosing a larger transmitting power level (step s304), and then the caution unit will transmits a caution note to a driver in the one of the other driving vehicles (step s305).

Figure 3B:
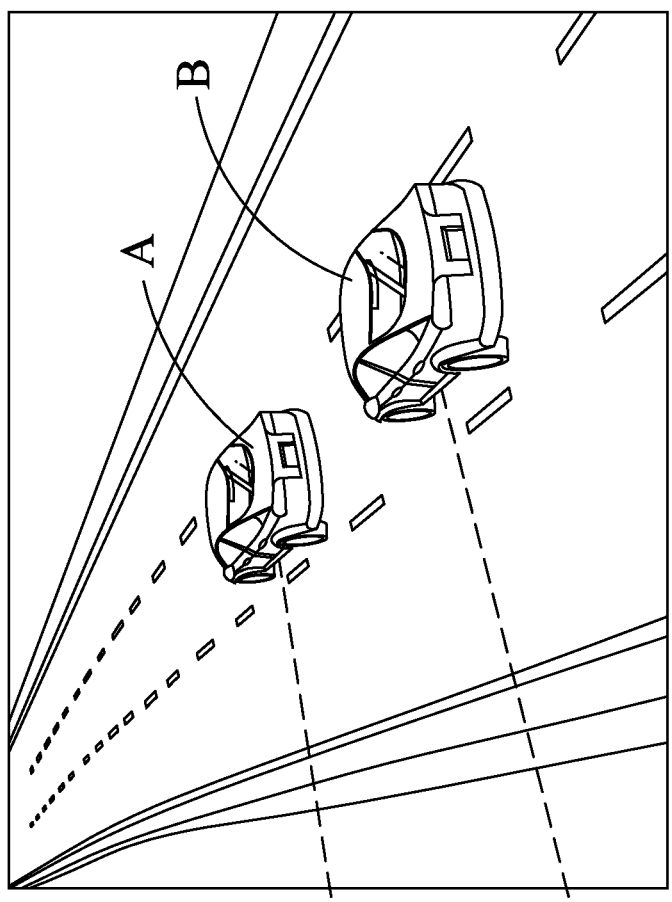
FIG. 3B illustrates an application case further describing the dynamic transmitting power control of FIG. 3A.

FIG. 3B illustrates an application case further describing a method of dynamic transmitting power control of FIG. 3A. In the case, car A and car B respectively use transmitting power level TPC=8 and TPC=28 to transmit current state information each other. After a period time, when the distance between car A and car B is too close, car A may discover that the relative speed between car A and car B is too fast, resulting in the traffic accident will be occurred. Therefore, car A may adopt the largest transmitting power level between car A and car B to transmit a caution note to car B for warning the driver in car B about the speed of car B is too fast or the distance between the car A and car B, and maybe the traffic accident will be occurred between the car A and car B. Thereby, the car A will ask the car B to decrease its speed for maintaining a safety distance between the car A and car B by the caution note.

Figure 4A:
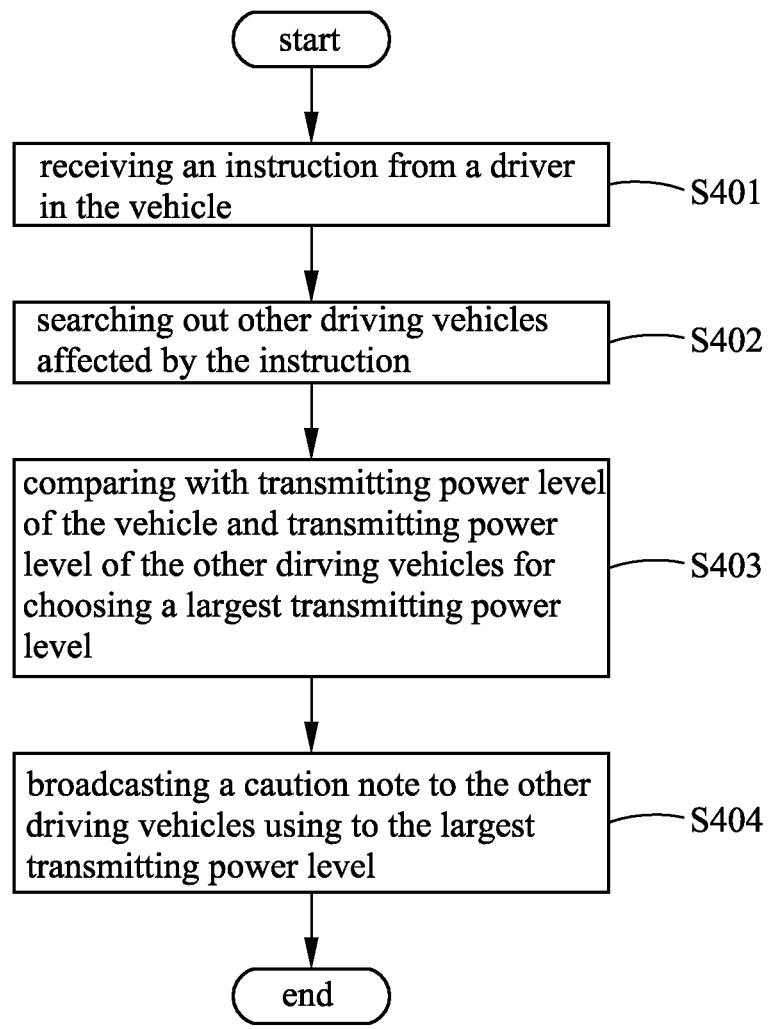
FIG. 4A illustrates a flow chart showing a wireless dynamic transmitting power control method according to another embodiment of the present disclosure.

FIG. 4A illustrates a flow chart showing a dynamic transmitting power control method according to another embodiment of the present disclosure. In the embodiment, it needs to refer to the wireless dynamic transmission power control system in FIG. 1 to describe the steps of the dynamic transmission power adjustment method in the embodiment. Firstly, when the caution unit 16 receives an instruction from a driver in the vehicle 10 (step s401), it will search out other driving vehicles affected by the instruction via the storing unit 12 (step s402). Specifically, the instruction includes turn (for example, turn left or turn right), slow down, emergency brake, driveway change or overtaking, etc. Subsequently, the transmitting power decided unit 14 compares the transmitting power level between the vehicle 10 and the other driving vehicles for choosing a largest transmitting power level between the vehicle 10 and the other driving vehicles (steps s403), and then broadcasts a caution note by using the largest transmitting power level to other driving vehicles (step s404).

Figure 4B:
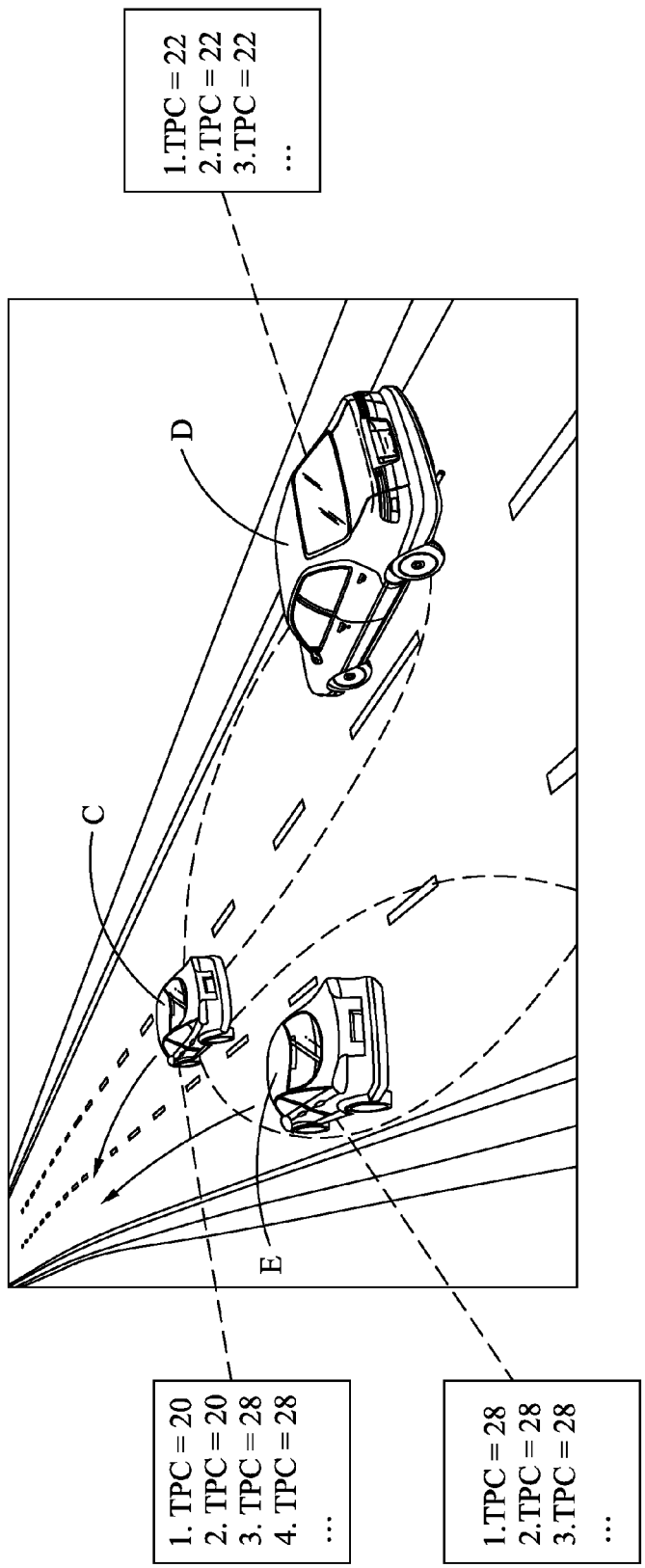
FIG. 4B illustrates an application case further describing the dynamic transmitting power control method of FIG. 4A.

FIG. 4B illustrates an application case further describing the dynamic transmitting power control method of FIG. 4A. In the application case, car C, car D and car E respectively use transmitting power level TPC=20, TPC=22 and TPC=28 to transmit current state information each other. When car C wants to change the driveway, which is same as car E driving, car C will search out current state information of car D and car E via the storing unit 22, and chooses a largest transmitting power level TPC=28 among car C, car D and car E to transmit a caution note to the car D and car E. When the car D and car E receive the caution note from car C, they will know the car C will change driveway and maybe the car C will crash to the car E. Thereby, car C may ask car E to decrease speed to keep a safe distance between the car C and car E and guarantee the safety of driving.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A system of dynamic wireless transmitting power control using on a vehicle, comprising:
    a receiving unit, for receiving current state information of other driving vehicles around the vehicle;
    a state unit, for obtaining current state information of the vehicle;
    a storing unit, coupled to the receiving unit and the state unit, for storing current state information of the vehicle and the other driving vehicles;
    a transmitting power decision unit, coupled to the storing unit and including a predetermined transmitting power level lookup table, a predetermined upper limit threshold and a predetermined lower limit threshold, wherein the transmitting power decision unit periodically adjusts transmitting power level of the vehicle for generating a reference transmitting power level lookup table, a reference lower limit threshold and a reference lower limit threshold when the vehicle drives for a period of time; and
    a transmitting unit, coupled to the state unit and the transmitting power decision unit, for transmitting the current state information of the vehicle to the other driving vehicles.

2. The system of claim 1, further comprising:
    a caution unit, coupled to the storing unit, for receiving an instruction from a driver in the vehicle, and determining whether traffic accident occurs according to current state information of the vehicle and the other driving vehicles.

3. The system of claim 2, wherein when the caution unit determines the traffic accident to be occurred, and the caution unit transmit a caution note to drivers of the vehicle and the other driving vehicles.

4. The system of claim 3, wherein the caution note includes image, voice, picture and text.

5. The system of claim 2, wherein the instruction is one of emergency brake, driveway change, turn and overtaking.

6. The system of claim 1, wherein current state information includes vehicle speed, location, model, number, transmitting power level and signature.

7. The system of claim 1, wherein the receiving unit further receives caution notes from the other driving vehicles.

8. The system of claim 1, wherein the storing unit is a queue storing device.

9. The system of claim 1, wherein the transmitting power decision unit obtains a transmitting power level of the vehicles according to the predetermined transmitting power level lookup table corresponding to the speed of the vehicle after the vehicle starts to drive.

10. The system of claim 1, wherein the transmitting power decision unit calculates the number of the other driving vehicles by counting current state information of the other driving vehicles obtained at least one unit cycle.

11. The system of claim 1, wherein the predetermined transmitting power level lookup table is established by automatic or manual.

12. The system of claim 1, wherein the relationship between the vehicle speed and the transmitting power control level in the predetermined transmitting power level lookup table is one of liner, polynomial, exponent and logarithm function.

13. The system of claim 1, wherein the transmitting power level decision unit determines traffic density state around the vehicle so as to adjust the transmitting power level according to comparison among the number of other driving vehicles, the predetermined upper limit threshold and the predetermined lower limit threshold.

14. The system of claim 13, wherein the vehicle is determined in crowded state so as to decrease the transmitting power level if the number of the other driving vehicles is larger than the predetermined upper limit threshold.

15. The system of claim 13, wherein the vehicle is determined in good flow quantity state so as to maintain the transmitting power level unchanged if the number of the other driving vehicles is located between the predetermined upper limit threshold and the predetermined lower limit threshold.

16. The system of claim 13, wherein the vehicle is determined in sparse state so as to increase the transmitting power level if the number of the other driving vehicles is smaller than the predetermined lower limit threshold.

17. The system of claim 13, wherein transmitting power level of the vehicle is periodically adjusted according to traffic density state around the vehicle so as to generate or update a reference transmitting power level lookup table, a reference upper limit threshold and a reference lower limit threshold.

18. A method of dynamic wireless transmitting power control using on a vehicle, comprising:
    obtaining current state information of the vehicle;
    deciding a transmitting power level according to a predetermined transmitting power level lookup table;
    obtaining current state information of other driving vehicles around the vehicle at least one unit cycle;
    calculating the number of the other driving vehicles;
    comparing with the number of the other driving vehicles, a predetermined upper limit threshold and a predetermined lower limit threshold for determining traffic density state around the vehicle; and
    transmitting current state information of the vehicle to the other driving vehicles.

19. The method of claim 18, further comprising:
    deciding the transmitting power level according to the predetermined transmitting power level lookup table corresponding to the speed of the vehicle and after the vehicle starts to drive.

20. The method of claim 18, further comprising:
    adjusting transmitting power level of the vehicle periodically according to traffic density state around the vehicle so as to generate or update a reference transmitting power level lookup table, a reference upper limit threshold and a reference lower limit threshold.

21. The method of claim 18, further comprising:
    storing current state information of the other driving vehicles around the vehicle, and obtaining the number of the other driving vehicles by counting current state information of the other driving vehicles received in at least one cycle.

22. The method of claim 18, further comprises:
    determining the vehicle is in crowded state so as to decrease the transmitting power level if the number of the other driving vehicles is larger than the predetermined upper limit threshold.

23. The method of claim 18, further comprises:
    determining the vehicle is in sparse state so as to increase the transmitting power level if the number of the other driving vehicles is smaller than the predetermined lower limit threshold.

24. The method of claim 18, further comprising:
    determining the vehicle is in good flow quantity state so as to maintain the transmitting power level unchanged if the number of the other driving vehicles is located between the predetermined upper limit threshold and the predetermined lower limit threshold.

* * * * *